Nov. 9, 1954 W. C. BURKHARD, JR., ET AL Re. 23,894
WATERPROOF SWITCH ASSEMBLY
Original Filed Jan. 12, 1950 2 Sheets-Sheet 1
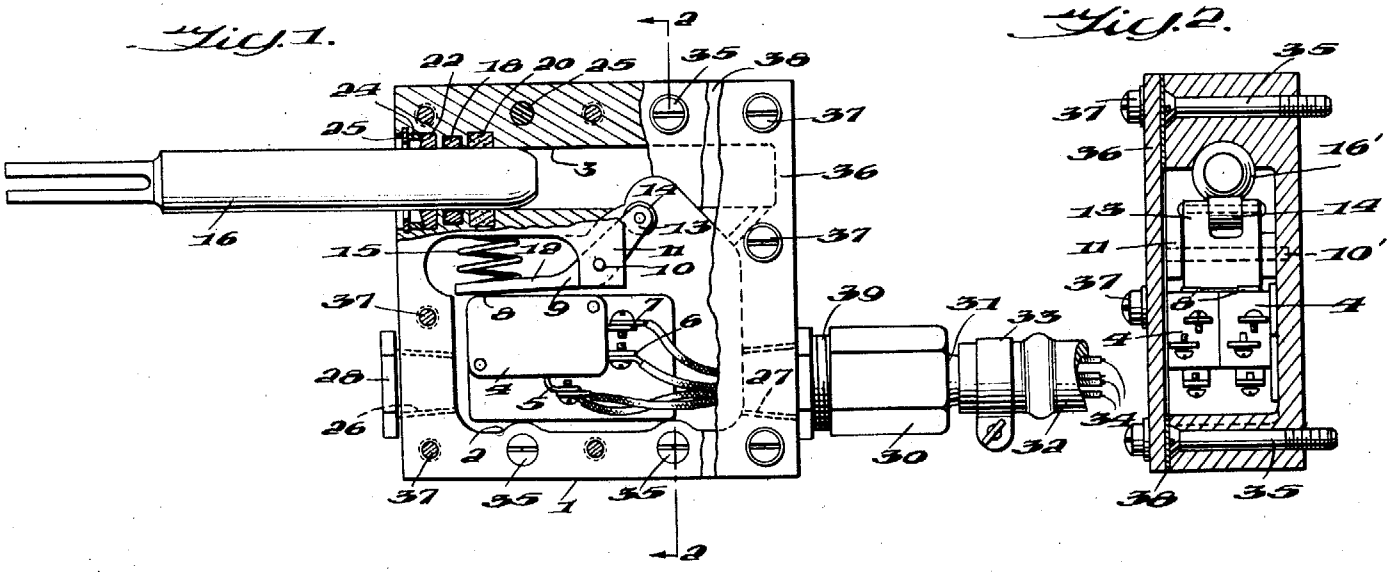
Fig. 1.
Fig. 2.
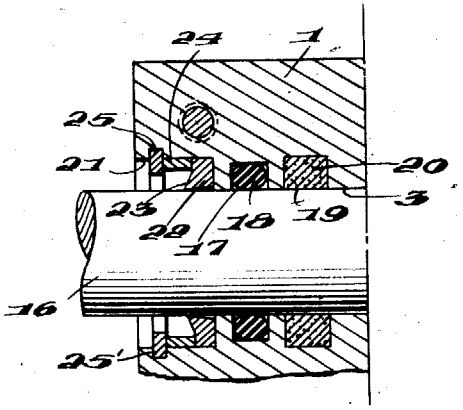
Fig. 3.
INVENTORS
WILLIAM C. BURKHARD, JR.
NICKOLAUS W. MAGYAR,
BY Martin E. Hogan Jr.
ATTORNEY

WATERPROOF SWITCH ASSEMBLY

Original Filed Jan. 12, 1950 2 Sheets-Sheet 2

INVENTORS
WILLIAM C. BURKHARD, JR.
NICKOLAUS W. MAGYAR,
BY
Martin E. Hogan Jr.
ATTORNEY United States Patent Office Re. 23,894
Reissued Nov. 9, 1954

23,894

WATERPROOF SWITCH ASSEMBLY

William C. Burkhard, Jr., Dallas, Tex., and Nickolaus W. Magyar, Baltimore, Md., assignors to The Glenn L. Martin Company, Middle River, Md., a corporation of Maryland Original No. 2,666,829, dated January 19, 1954, Serial No. 138,126, January 12, 1950. Application for reissue June 10, 1954, Serial No. 435,961

7 Claims. (Cl. 200—168)

Matter enclosed in heavy brackets [ ] appears in the original patent but forms no part of this reissue specification; matter printed in italics indicates the additions made by reissue.

This invention relates to an improved switch assembly especially intended for underwater use or wherever a switch would be liable to come into contact with water.

It is an object of this invention to produce a compact, lightweight switch assembly which will prevent the ingress of water or water vapor into the interior of the switch mechanism.

It is a further object of this invention to provide a waterproof switch assembly which may be readily converted to either a rotary or reciprocating type of actuation, and in either of which conditions the switch assembly will be effectively sealed against the ingress of moisture.

Further and other objects will become apparent from the following description and claims especially when taken in view of the accompanying drawing.

In the drawing:

Figure 1 is a plan view of a switch embodying the invention, with portions shown broken away.

Figure 2 is a sectional view taken on the line 2—2 of Figure 1.

Figure 3 is an enlarged fragmentary sectional view of a portion of the switch shown in Figure 1.

Figure 5:
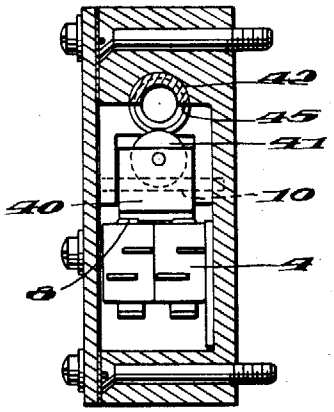
Figure 5 is a sectional view taken on the line 5—5 of Figure 4.

Figures 1 to 3 show the reciprocating form of waterproof switch of this invention. The switch assembly comprises a housing 1 provided with an interior recess 2 shaped as clearly shown in Figures 1 and 2. As is also clearly shown in Figure 1, the housing is further provided with a cylindrical bore 3 extending from the exterior of the housing into intersecting relationship with the recess 2.

Mounted within the recess is a pair of switch units 4, the particular switches shown each being of the single-pole double-throw type having the conventional terminals 5, 6 and 7, and each being provided with an actuator 8 protruding slightly from one side thereof. An actuating lever 9 is pivotally carried by a pin 10 extending through a suitable ear 11 protruding inwardly from one wall of the recess. The opposite end of pin 10 is seated in a suitable hole 10′ provided in the base wall of the housing. Lever 9 including an actuating portion 12 and a cam follower portion 13, the latter being bifurcated as shown in Figure 2 and carrying a roller 14. Lever 9 is normally biased by spring 15 acting against the wall of the recess, so that the actuating portion 12 depresses the actuators 8 of the switch units. As is clearly shown in Figure 1, the roller 14 of the cam follower portion of lever 9 then extends slightly into the bore 3.

Mounted for reciprocation within the bore 3 is a substantially cylindrical actuating shaft 16, the inner end of which is spherically rounded as indicated at 16′. When the actuator shaft 16 is moved axially inwardly along the bore 3 the spherical camming portion 16′ will engage roller 14 on lever 9 and cause lever 9 to rotate in a clockwise direction (Figure 1) against the opposition of spring 15. This will permit the switch actuators 8 to move outwardly under the action of the usual springs (not shown)

incorporated in the switch units, causing a reversal of the electrical connections (not shown) within the switches in the normal fashion.

To insure against the ingress of moisture into the housing, the following arrangement is provided. Spaced somewhat inwardly from the outer end of bore 3 is a peripheral groove 17. Located within the groove is an O-ring seal 18, of synthetic rubber-like material which completely encircles the shaft 16 and which coacts with the shaft and the housing to effectively seal against the progress of any moisture inwardly beyond this point. Spaced slightly further inwardly along the bore 3, another peripheral groove 19 is provided. This groove is filled with an oil-soaked, felt-like packing 20. The use of this felt packing is found to greatly prolong the effective life of the O-ring seal 18 since the oil entrapped in the packing tends to work along the shaft 16 and to keep the O-ring slightly moist with oil, thus retarding any tendency of the O-ring to harden and lose its sealing action.

Where, as in this case, the actuating shaft is arranged for reciprocating motion. there would normally be danger that, under icing conditions, a thin layer of ice might form on the exterior of the shaft and, when the shaft was moved inwardly from the Figure 1 position to actuate the switch mechanism, that small fragments of ice would find their way into the area of the O-ring seal causing damage thereto and permitting leakage past the seal. To guard against such an eventuality, the outermost portion of bore 3 is provided with a counterbore 21. Carried within this counterbore 21 is a ring-shaped ice scraper 22 having its outer corner 23 arranged to form a cutting edge closely encircling the shaft 16. The scraper ring is secured in place by means of a spacer ring 24 which in turn is secured in place by a snap ring 25 engaged in a suitable slot 25′ adjacent the exterior end of the counterbore 21.

Provision is made for bringing the necessary electrical leads 34 into the interior of the switch assembly while maintaining a perfectly water-tight unit. As shown in Figure 1, these electrical leads may be brought in through either of two ports 26 or 27 in opposite walls of the housing 1. Normally only one of these ports will be used for this purpose and the other will be sealed by a threaded plug 28.

A nipple 29 is threaded into the other port 27, and screwed onto the outer end of this nipple is an adapter 30 provided with an outwardly extending tubular portion 31 adapted to fit snugly within the end of flexible conduit 32, clamped thereon as at 33. The leads 34 extend from the switch terminals, through the hollow interior of the nipple and adapter, and thence, within the conduit 32, to whatever point is desired. Within the adapter and nipple is a conventional rubber-like element (not shown) through which the individual leads extend and which element is compressed when the adapter is screwed onto the nipple so as to firmly embrace the leads and form a water-tight seal thereabout. This type of seal for the electrical leads is well known in the art and specifically forms no part of the present invention.

Provision is made for mounting the switch assembly as by means of mounting screens 35 extending therethrough as shown in Figure 1 and Figure 2. Obviously other mounting arrangements could be substituted if so desired. The housing is provided with a removable cover plate 36 adapted to be bolted firmly onto the upper face of the housing as indicated at 37, a suitable sealing gasket 38 being provided therebetween to insure against the ingress of moisture.

Figure 4:
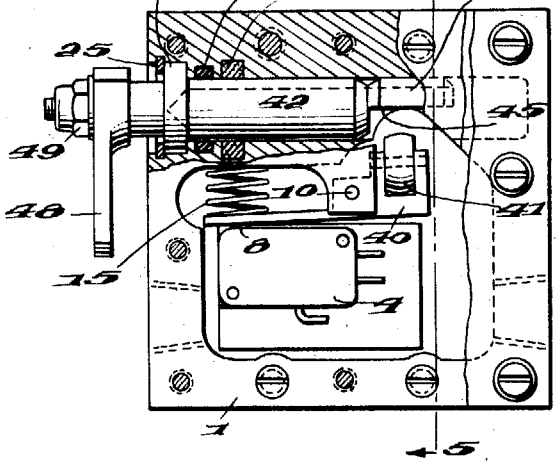
Figure 4 is a view corresponding to Figure 1 and showing a modified switch construction.
Figure 6:
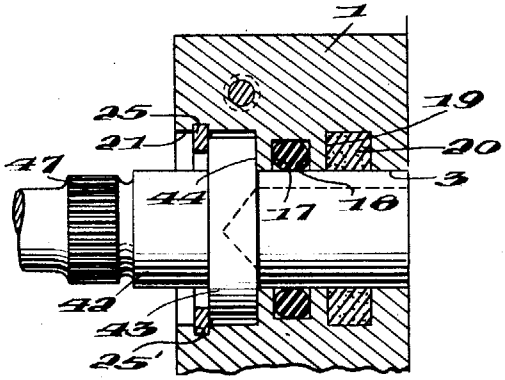
Figure 6 is a fragmentary sectional view of a portion of the switch shown in Figure 4.

Turning now to Figures 4 to 6 there is shown a form of waterproof switch assembly having a rotary type of actuation.

This rotary type switch assembly differs but slightly from the reciprocating type above-described, a different actuating shaft and a different actuating lever being used thereon. Also the ice scraper ring and spacer ring are eliminated. However as can be seen from the drawing, the other elements of this switch are identical with those of the switch previously described, these elements being designated by the same reference numerals as were applied in Figures 1 to 3. In this rotary type switch, the actuating lever 40 is provided with a roller 41 mounted on an axis generally perpendicular to the axis of the pin 10. The actuating shaft 42 includes near its outer end a shoulder 43 which seats between the inner wall 44 of the counterbore 21 and the snap ring 25. Thus the shaft 42 is held against axial movement but is free to rotate about the axis of bore 3. The inner end of shaft 42 has a flat 45 formed on one side thereof which flat constitutes a camming surface. With the actuating shaft arranged as in Figure 4, the flat 45 will be spaced away from the roller 41, with the result that under these conditions the lever 40 will be biased by spring 15 into operative engagement with the switch actuators 8. When, however, the actuating shaft is rotated, the flat 45 will engage the roller 41 and cause the lever 40 to swing in a clockwise direction about pivot 10. Continued rotation of the shaft 42 will cause the roller to ride up onto the outer peripheral portion 46 of the camming end of the shaft to hold the lever 40 away from the contact with the actuators 8.

The outer end of the shaft 42 is splined as shown at 47 (see Figure 6) and a correspondingly splined operating lever 48 is secured thereon by means of a nut 49. This splined arrangement of the lever 48 and shaft 42 not only insures against slipping of the lever on the shaft but also provides for ready adjustment of the angular position of the lever relative to the camming surface of the shaft to vary the point of switch actuation. While the flat camming portion 45 is shown in this particular instance as being substantially on a diameter of the actuating shaft 42, it is obvious that this relationship can be changed to vary the relative amounts of travel of the operating lever 48 with the switches in actuated or unactuated positions. Thus, for example, where it was desired to provide an arrangement wherein the switch actuators 8 were held depressed during but a few degrees of movement of the operating lever 48, the flat would be arranged to extend over a correspondingly smaller portion of the width of the shaft. As shown, the actuated and non-actuated conditions of the switches will each obtain throughout approximately 180° of movement of the operating lever.

The operation of the two types of switches described above is believed to be obvious. In the reciprocating switch of Figures 1 to 3, the outer end portion of the actuating shaft 16 will be suitably attached to a desired operating mechanism having a reciprocating motion. Moving the shaft 16 inwardly into camming engagement with the roller 14 will cause lever 9 to release the actuators 8 whereby to reverse the switch contacts (not shown) in the usual fashion. The O-ring seal 18 will effectively prevent the ingress of moisture into the interior of the switch assembly and the oil soaked packing 20 will, as above described, maintain the O-ring seal slightly moist with oil so as to greatly prolong its effective life. Since the packing 20 is spaced inwardly beyond the O-ring seal, it will not be subject to contact with water and will therefore retain its lubricating qualities over a relatively greater period of time. The ice scraper 22 will be effective whenever the shaft is moved inwardly to actuate the switch mechanism to remove any ice which may have formed on the exterior of the shaft and thus will prevent damage to the O-ring seal.

In the rotary type of switch shown in Figures 4 to 6, the action is quite similar. Here again the O-ring seal prevents the ingress of moisture and the packing 20 serves to lubricate the shaft and the O-ring seal. Even through the motion of the operating shaft 42 is rotary, some oil will work along the surface of the shaft to reach and lubricate the O-ring seal.

It should be noted that either of these switches can be readily converted into the other type with a minimum of effort since the housing and most of the other elements are identical in the two forms. For example, to convert the reciprocating switch of Figure 1 to the rotary switch of Figure 4, the cover plate 36 is first removed and lever 40 is substituted for lever 9 after pulling pivot pin 10. Then the shaft 16 is slid out of the bore 3 and the retaining ring 25 removed. The spacer ring 24 and the ice scraper 22 may then be slid out of the counterbore 21 and the rotary type of actuating shaft 42 may then be slid into bore 3 until its shoulder 43 engages the end wall 44 of the counterbore 21. Since the axial width of the shoulder 43 is substantially the same as the sum of the axial width of the spacer ring 24 and the ice scraper 22, the same retaining ring 25 may be snapped back into place within the slot 25' to hold the shaft 42 in desired position. After inspection to determine that the parts are in their proper operative relationship, the cover plate 36 will again be fastened to the housing.

While but two forms of the invention have been particularly shown and described in the specification, it is believed obvious that many variations and alterations may be made without departing from the spirit and scope of the appended claims.

We claim as our invention:

1. A waterproof switch assembly comprising a watertight housing having a recess formed therein, electrical switch means mounted within said recess and including depressible actuator means, said housing being provided with a generally cylindrical bore opening through one side of said housing and extending from the exterior of said housing generally alongside said recess in spaced relationship thereto and into communication with said recess adjacent the remote side thereof, a lever pivotally mounted within said recess and spring means normally biasing said lever so that one portion thereof engages and depresses said switch actuator means and a second portion thereof extends into the area of intersection of the bore and the recess, a generally cylindrical operating shaft adapted to be slidably inserted into said bore from the exterior of said housing, said shaft being movably carried within said bore and having its inner end formed as a cam adapted upon actuation of said shaft to engage said second follower portion of said lever to cause the lever to swing to a position releasing said actuator means, said bore being provided with a plurality of peripheral grooves adjacent its outer end, an O-ring seal being arranged in one of said grooves to sealably engage said operating shaft, and an oil-soaked felt-like packing inserted in another of said grooves displaced axially inwardly from said O-ring seal.

2. A waterproof switch assembly comprising a watertight housing having a recess formed therein, electrical switch means mounted within said recess, said housing being provided with a cylindrical bore opening through one side of said housing and extending from the exterior of said housing generally alongside said recess in spaced relationship thereto and into communication with said recess adjacent the remote side thereof, an actuating shaft adapted to be slidably inserted into said bore from the exterior of said housing and mounted for movement in said bore, means mounted in said recess and extending into said bore for engagement by the inner end portion of said shaft and responsive to a predetermined movement of said shaft for actuating said switch means, said bore being provided with a plurality of peripheral grooves spaced inwardly from the outer end of said bore, an O-ring seal located within one of said grooves and arranged to sealably engage said actuating shaft, and lubricating means in another of said grooves spaced axially inwardly along said bore from said first mentioned groove.

3. A waterproof switch assembly comprising a watertight housing having a recess formed therein, electrical switch means mounted within said recess, said housing being provided with a cylindrical bore opening through one side of said housing and extending from the exterior of said housing generally alongside said recess in spaced relationship thereto and into communication with said recess adjacent the remote side thereof, an actuating shaft adapted to be slidably inserted into said bore from the exterior of said housing and mounted for movement in said bore, means mounted in said recess and extending into said bore for engagement by the inner end portion of said shaft and responsive to a predetermined movement of said shaft for actuating said switch means, said bore being provided with a plurality of peripheral grooves spaced inwardly from the outer end of said bore, an O-ring seal located within one of said grooves and arranged to sealably engage said actuating shaft, and lubricating means in another of said grooves spaced axially inwardly along said bore from said first mentioned groove, said actuating shaft being arranged for reciprocating motion in said bore to actuate said switch means, and an ice scraper carried by said housing axially outwardly from said O-ring seal and arranged to closely surround said shaft.

4. A waterproof switch assembly comprising a watertight housing having a recess formed therein, electrical switch means mounted within said recess, said housing being provided with a cylindrical bore opening through one side of said housing and extending from the exterior of said housing generally alongside said recess in spaced relationship thereto and into communication with said recess adjacent the remote side thereof, an actuating shaft adapted to be slidably inserted into said bore from the exterior of said housing and mounted for movement in said bore, means mounted in said recess and extending into said bore for engagetment by the inner end portion of said shaft and responsive to a predetermined movement of said shaft for actuating said switch means, said bore being provided with a plurality of peripheral grooves spaced inwardly from the outer end of said bore, and an O-ring seal located within one of said grooves and arranged to sealably engage said actuating shaft, and lubricating means in another of said grooves spaced axially inwardly along said bore from said first mentioned groove, said actuating shaft being arranged for rotary movement in said bore, and means carried by said housing for restraining said shaft against reciprocating movement in said bore.

5. *For use with either a rotary or reciprocatory actuating part, a convertible waterproof switch assembly comprising a watertight housing having a recess formed therein, said recess having a main portion and an auxiliary portion extending to one side of the main portion at an end thereof, electrical switch means mounted within the main portion of said recess and including depressible actuator means, said housing being provided with a generally cylindrical bore opening through one side of said housing and extending from the exterior of said housing generally alongside the main portion of said recess in spaced relationship thereto and into communication with the auxiliary portion of said recess, a lever pivotally mounted within the main portion of said recess on an axis substantially midway between its ends and lying along that side of the recess adjacent said bore and said auxiliary portion, spring means normally biasing said lever so that one end thereof engages and depresses said switch actuator means and the other end or follower portion thereof extends slightly into the space defined by extension of the bore into the auxiliary recess portion, said bore being provided with a peripheral groove adjacent its outer end, an O-ring seal arranged in said groove to sealably engage against a cylindrical shaft snugly fitting said bore with a free-moving fit whether sliding or rotating, whereby the assembly may be operated either by a reciprocating operating shaft fitting said bore and having a cam nose for contacting said follower portion, or by a rotary operating shaft fitting said bore and having a cut-out portion disposed within said auxiliary recess portion in rotary operating relation to said follower portion when the rotary shaft is fully inserted, such reciprocating and rotary shafts being interchangeable by axial insertion or withdrawal thereof into or from said bore and either one forming with said seal a water-tight closure for the housing regardless of the nature of its operation.*

6. *For use with a rotary or reciprocatory actuating part, a convertible waterproof switch assembly comprising a watertight housing having a recess formed therein, said recess having a main portion and an auxiliary portion extending to one side of the main portion at an end thereof, electrical switch means mounted within the main portion of said recess and including depressible actuator means, said housing being provided with a generally cylindrical bore opening through one side of said housing and extending from the exterior of said housing generally alongside and into communication with the auxiliary portion of said recess, said housing being provided with an enlarged counterbore at the opening of said bore and a retainer ring groove at the mouth of said counterbore, a lever pivotally mounted within the main portion of said recess on an axis substantially midway between its ends and lying along that side of the recess adjacent said bore and said auxiliary portion, spring means normally biasing said lever so that one end thereof engages and depresses said switch actuator means and the other end or follower portion thereof extends slightly into the space defined by extension of the bore into the auxiliary recess portion, said bore being provided with a peripheral groove adjacent said counterbore, an O-ring seal arranged in said groove to sealably engage against a cylindrical shaft snugly fitting said bore with a free-moving fit whether sliding or rotating, whereby the assembly may be operated either by a reciprocating operating shaft fitting said bore and having a cam nose for contacting said follower portion, or by a rotary operating shaft including a fixed locating collar and fitting said bore and having cut-out portion disposed within said auxiliary recess portion in rotary operating relation to said follower portion when the rotary shaft is fully inserted, such reciprocating and rotary shafts being interchangeable by axial insertion or withdrawal thereof into or from said bore and either one forming with said seal a water-tight closure for the housing regardless of the nature of its operation, said counterbore providing for reception of a scraper ring cooperating with the reciprocating operating shaft and held in place by a retainer ring in said groove, or reception of the locating collar on the rotating operating shaft whereby the latter may be retained against axial displacement by a retainer ring in said groove.*

7. *For use with either a rotary or reciprocatory actuating part, a convertible waterproof switch assembly comprising a watertight housing having a recess formed therein, said recess having a main portion and an auxiliary portion extending to one side of the main portion at an end thereof, electrical switch means mounted within the main portion of said recess and including depressible actuator means, said housing being provided with a generally cylindrical bore opening through one side of said housing and extending from the exterior of said housing generally alongside the main portion of said recess in spaced relationship thereto and into communication with the auxiliary portion of said recess, a pivot pin in said housing within the main portion of said recess and extending to one side of and transversely of said bore and designed for the reception of either of a pair of levers, one lever provided with a follower portion including a roller rotatable on the lever about an axis parallel to said pin, the second provided with a follower portion including a roller rotatable on the lever about an axis extending transversely of said pin, each of said levers having an opening for pivotally mounting the same on said pivot pin within the main portion of said recess on an axis substantially midway between its ends with the lever lying along that side of the recess adjacent said bore and said auxiliary portion, spring means normally biasing either mounted lever so that one end thereof engages and depresses said switch actuator means and the other end or follower portion thereof extends slightly into the space defined by extension of the bore into the auxiliary recess portion, said bore being provided with a peripheral groove adjacent its outer end, an O-ring seal arranged in said groove to sealably engage against a cylindrical shaft snugly fitting said bore with a free-moving fit whether sliding or rotating, whereby the assembly may be operated either by a reciprocating operating shaft fitting said bore and having a cam nose for contacting the follower portion of said one lever when in place on said pin, or by a rotary operating shaft fitting said bore and having a cutout portion disposed within said auxiliary recess portion in rotary operating relation to the follower portion of said second lever when in place on said pin and when the rotary shaft is fully inserted, such reciprocating and rotary shafts being interchangeable by axial insertion or withdrawal thereof into or from said bore and either one forming with said seal a water-tight closure for the housing regardless of the nature of its operation, and said levers being interchangeable to correspond with the shaft in use by mounting on or dismounting from said pivot pin.*

References Cited in the file of this patent or the original patent

UNITED STATES PATENTS

| Number | Name | Date |
|---|---|---|
| 1,776,911 | Jones | Sept. 30, 1930 |
| 2,181,829 | Jeffrey | Nov. 28, 1939 |
| 2,289,108 | Eaton | July 7, 1942 |
| 2,431,747 | Fry | Dec. 2, 1947 |
| 2,490,566 | Wishart | Dec. 6, 1949 |